(No Model.)
R. CLARKE.
TRAP.
No. 267,973. Patented Nov. 21, 1882.
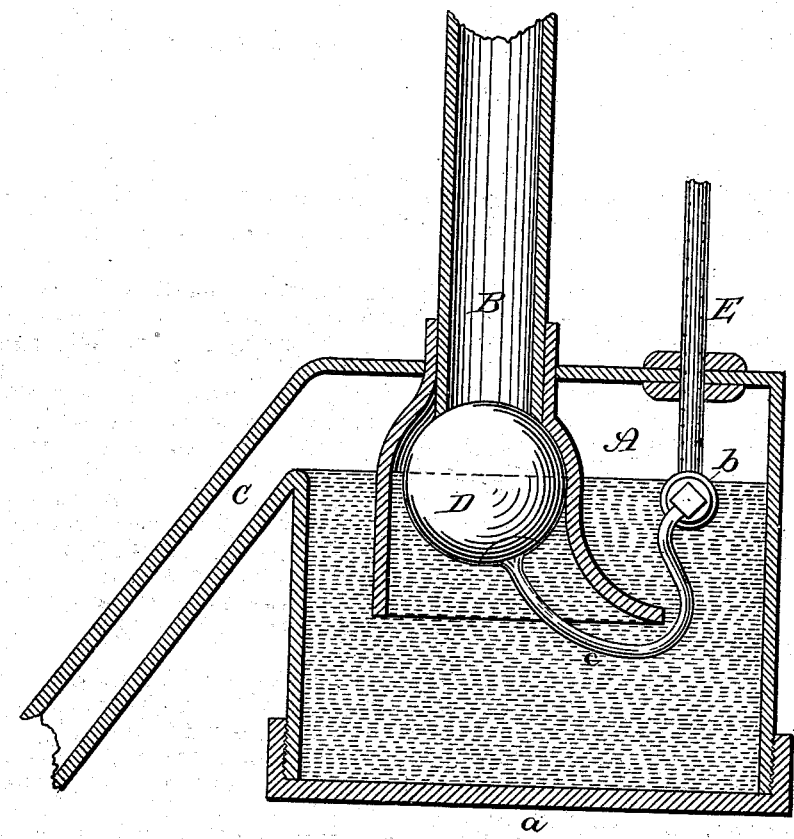
Witnesses:
H. E. Hansmann.
Josephine Campbell.
Inventor:
R. Clarke
By his attorney
Charles E. Foster

UNITED STATES PATENT OFFICE.

ROBERT CLARKE, OF BROOKLYN, NEW YORK.

TRAP.

SPECIFICATION forming part of Letters Patent No. 267,973, dated November 21, 1882.

Application filed January 25, 1882. Renewed October 11, 1882. (No model.)

*To all whom it may concern:*

Be it known that I, ROBERT CLARKE, a citizen of the United States, and a resident of Brooklyn, Kings county, New York, have invented Improvements in Traps, of which the following is a specification.

The object of my invention is to prevent the injurious effects resulting from the exhausting of the supply of water in an ordinary trap, and this I effect by connecting a ball or float to a valve or cock so as to cause a supply of water to be thrown into the chamber of the trap whenever the ball is caused to descend by the siphoning or evaporation of water in the trap.

In the drawing is represented an ordinary ball-trap, A being the case, constructed of glass or metal in any suitable manner; B, the inlet-pipe, extending into the trap, and C the discharge-pipe. As shown, the case A is nearly cylindrical, with a bottom screw-cap, a, which may be removed to cleanse the trap or get at the devices within the same. Within the case A is a float or ball valve, D, which effectually closes the end of the pipe B when the case is full of fluid, so as to prevent the vapors from the fluid from rising in the pipe, but which is readily displaced to permit the fluid to pass down the pipe into the chamber. This class of traps is defective, from the liability of the chamber to be emptied by siphoning or from the gradual evaporation of the contents when the trap is not used continuously. I overcome this difficulty without increasing the dimensions of the trap by providing the same with a water-supply pipe, E, and a valve or cock, b, which I connect to the ball by an arm, e, as shown, or in any other suitable manner, so as to be worked automatically by the rise and fall of water in the trap. The connection and arrangement is such that the ball or float D can play to such an extent as to perform its ordinary functions, and should the supply of fluid in the case get low from evaporation or siphoning, the valve will be opened and sufficient water be admitted to seal the trap. It will thus be seen that the trap is maintained in a sealed condition, regardless of the extent of its use or the effects of siphoning.

I claim—

1. A trap provided with a ball, D, within the casing A, and with an inlet water-supply pipe and cock connected to the ball, whereby the supply of water in the trap is maintained and the sealing of the trap secured, substantially as set forth.

2. The combination, in a trap, of the case A, containing the ball-valve D, the inlet and outlet pipes B C, water-supply pipe E, and cock b, connected to the ball D, substantially as set forth.

In testimony whereof I have signed my name to this specification in the presence of two subscribing witnesses.

ROBT. CLARKE.

Witnesses:
JAMES J. DOODY,
THOS. H. MORTIMER.